Aug. 29, 1950 A. P. JACKEL ET AL 2,520,840
APPARATUS FOR AUTOMATICALLY CHECKING THE OPERATION
OF PULSE-ECHO RADIO DETECTION SYSTEMS
Filed Feb. 15, 1947 5 Sheets-Sheet 1

INVENTORS
Arthur P. Jackel and
BY Frank H. Nicholson.
Their Attorney.

INVENTORS.
Arthur P. Jackel and
BY Frank H. Nicholson.

Their Attorney.

Aug. 29, 1950  A. P. JACKEL ET AL  2,520,840
APPARATUS FOR AUTOMATICALLY CHECKING THE OPERATION
OF PULSE-ECHO RADIO DETECTION SYSTEMS
Filed Feb. 15, 1947  5 Sheets-Sheet 5

INVENTORS
Arthur P. Jackel and
Frank H. Nicholson.
BY
Their Attorney.

Patented Aug. 29, 1950

2,520,840

UNITED STATES PATENT OFFICE 2,520,840

APPARATUS FOR AUTOMATICALLY CHECKING THE OPERATION OF PULSE-ECHO RADIO DETECTION SYSTEMS

Arthur P. Jackel and Frank H. Nicholson, Penn Township, Allegheny County, Pa., assignors to The Union Switch & Signal Company, Swissvale, Pa., a corporation of Pennsylvania Application February 15, 1947, Serial No. 728,770

12 Claims. (Cl. 343—13)

Our invention relates to systems of object detection employing radiant energy, and especially to systems of radio detecting and distance measurement, such as radar systems, and more particularly to a method and means for continuously checking the operation of such systems. Our invention has particular value in detecting occupany of airway traffic lanes and may be used in any case where it is essential to continuously check the proper operation of radiant energy object detection equipment. It may be applied to radar systems mounted on any type of moving vehicle for the detection of obstacles, and also may be used with fixed radar equipment for the detection of moving objects.

Essentially, radar is a system of detection which utilizes the property of reflection of electromagnetic energy from objects encountered in its propagation through space. In a pulse-echo type of radar system wherein short pulses of radio energy are transmitted from the radar equipment, and are received after reflection from an object, the time required for a pulse of energy to travel outward from the radar equipment and return from a target may be measured, and the distance from the radar equipment to the target is proportional to this time.

In systems of this type detection of the presence of an aircraft or other objects is dependent on operation of the transmitter to transmit radiant energy, and upon operation of the receiver to respond to reflected energy. Obviously, if the transmitter is not functioning properly and fails to transmit energy, or if the receiver is not functioning as intended and fails to respond to reflected energy, the equipment will fail to indicate the presence of an aircraft.

In previous systems of this type, no positive means is provided for continuously checking the proper operation of the equipment. Tube failures and other derangements of the equipment can result in the non-detection of a target, which may lead to serious consequences.

It is an object of this invention to provide a method of, and means for, continuously checking the operation of radiant energy object detection systems.

Another object of this invention is to provide a method of, and means for, continuously and safely checking the operation of pulse radar systems so that any failure of the equipment will not result in the non-detection of a target.

A further object of the invention is to provide a radiant energy object detection system which will operate to indicate that no object is present only if the system is functioning as intended so that it will detect an object if present.

Another object of the invention is to provide a radiant energy object detection system which incorporates checking means that continuously checks operation of the equipment, and which, if the system is not functioning as intended, causes the same indication to be displayed as is displayed when an object is detected.

Another object of this invention is to provide a method of, and means for, detection of objects which will promptly indicate a failure of any of the components of the system.

A further object of this invention is to provide a reliable means of airway lane occupancy detection.

Still another object of this invention is to provide a reliable means of airway lane occupancy detection responsive to airway traffic at a given nominal altitude only.

Other objects of the invention and features of novelty will be apparent from the following description taken in connection with the accompanying drawings.

We shall describe a few forms of object detecting means embodying our invention, and shall then point out the novel features thereof in claims.

In practicing our invention we employ a conventional pulse radar system which is arranged to cover the area to be protected either by conventional scanning means or by having a beam width sufficient to cover the area without scanning. The receiving portion of the radar system is modified to control a code following detector relay, and is arranged so that the detection of a target will cause the relay to be energized so it will pick up and close its front contacts. This relay, when released, will close its back contacts. By appropriate means an artificial or phantom target is recurrently presented to the radar system at predetermined intervals, for example, 180 times per minute. Accordingly, 180 times per minute the radar detects the artificial or phantom target, and as long as the protected area is vacant, the detector relay picks up and releases, and thereby alternately closes its front and back contacts at this rate. By appropriate decoding circuits, well-known in the railway signaling art, a control relay is energized when and only when the detector relay contacts are recurrently operated between their two positions. Accordingly, during the time in which no actual target is present in the area covered by the radar, the control relay is energized. When a target enters the area covered by this system, a substantially continuous reflection is received from the actual target, in addition to the recurrent reflections from the phantom target. Accordingly, the detector relay remains energized continuously at this time and the cessation of operation of its contacts causes the control relay to release.

Failure of any element in the equipment will also cause the detector relay to remain either energized or deenergized continuously, and such a condition will also cause the control relay to release.

Equipment embodying our invention may also be used for the detection of obstacles at a given nominal distance or altitude only, by the incorporation of the proper time delay and pulse gate circuits. Such an embodiment is especially applicable to airway lane occupancy detection, the equipment providing a degree of safety analogous to the coded type of track circuit, well-known in the railway signaling art.

In the drawings.

Similar reference characters refer to similar parts in each of the views.

Figure 1:
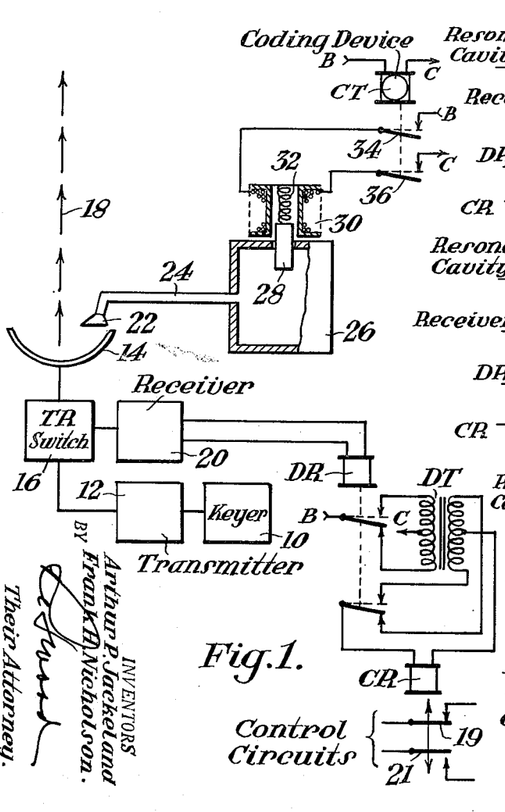
Fig. 1 is a diagram showing an arrangement of pulse radar equipment embodying our invention wherein the radar equipment is checked at all ranges.

Referring to Fig. 1, there is shown therein the components of a microwave pulse radar system following the conventional arrangement. A pulse generator or keyer 10 modulates a microwave transmitter 12 to deliver through a TR switch 16 to the directive antenna 14 recurring pulses 18 of electromagnetic energy having a selected carrier frequency. The pulses of radio energy 18 are then propagated through space in a pattern determined by the construction of the antenna 14. After reflection from the target the pulses are picked up by the antenna 14 and the TR switch 16 diverts them to a receiver 20 where they are amplified and demodulated. The output of the receiver 20 is supplied to a code following detector relay DR. This relay has contacts which are biased to a released position when the relay is deenergized, and is so selected as to be insensitive to the usual "noise" present in the receiver output, but so as to respond to energy levels in the receiver output caused by the reception of a signal composed of reflected pulses of radio energy. The receiver is constructed and arranged so that it will supply energy sufficient to operate the contacts of relay DR only when reflections are received from a target such as an aircraft, and will not cause the relay DR to be operated when spurious reflections are received from cloud banks, birds, and the like.

The relay DR has associated therewith a slow-acting control relay CR which is energized by current supplied through a decoding transformer DT when and only when the detector relay DR follows coded energy as explained in Letters Patent of the United States No. 2,237,788 to Frank H. Nicholson et al.

The contacts of control relay CR operate to close or open various control circuits according as the system does not or does detect an object, and also according as the system is or is not functioning properly.

It is to be understood that the indication that no aircraft is present in the searched area is provided by a circuit including contact 19 of relay CR which is closed when and only when relay CR is energized and its contacts are picked up.

It is to be understood also that when relay CR is deenergized and its contacts are released, its contact 21 establishes a circuit for providing an indication that the searched zone is occupied. As hereinafter explained this indication is also displayed if the radar equipment is not functioning as intended.

A small antenna, here shown as a horn 22, is arranged to pick up energy radiated from the antenna 14. A transmission line, here shown as a wave guide 24, conducts the energy picked up by the horn 22 to an "echo box" 26. This is essentially a resonant cavity capable of storing radio energy, and is rendered tunable by varying its effective volume. As shown, this is accomplished by means of an adjustable tuning slug 28. The tuning slug 28 is normally retained in the resonator by a biasing spring 32 and is retracted from the resonant cavity by a solenoid winding 30. The resonant cavity is constructed so that it is resonant to the carrier frequency of the transmitter 12 when and only when the tuning slug 28 is withdrawn from the cavity by solenoid winding 30.

The solenoid winding 30 is energized by a circuit which is controlled by the contacts 34 and 36 of coding device CT, which has contacts recurrently operated at some selected rate, as for example, 180 times per minute. The coding device CT may be of any well-known construction, as for example, as shown in Letters Patent of the United States No. 1,913,826 to Herman G. Blosser. Energy for the operation of various components including the solenoid winding 30 is supplied from a source of direct current, not shown, whose positive and negative terminals are denoted as B and C, respectively.

The circuit for energizing solenoid winding 30 is traced from terminal B, over front contact 34 of coding device CT, through the winding of solenoid winding 30, and over front contact 36 of coding device CT to terminal C. The coding device CT is of the type which recurrently operates its contacts between two positions, and its contacts remain in one position substantially as long as they remain in their other position. The coding device CT is continuously connected with the source of direct current, and opens and closes its contacts 180 times per minute, and thus causes the tuning slug 28 to be operated at the same rate.

As a result, the cavity resonator 26 is alternately tuned to and detuned from the frequency of the transmitter 12 approximately 180 times per minute, and has tuned and detuned periods which are substantially equal in duration.

In the operation, the radar transmitter operates continuously, causing short pulses of radio energy to be recurrently radiated from the antenna 14 at a rate and duration determined by the keyer 10. During the intervals in which the transmitter is operating, the TR switch 16 connects the transmitter 12 to the antenna 14 and effectively disconnects receiver 20, while during the intervals in which the transmitter is inoperative, the TR switch 16 connects the receiver 20 to the antenna 14 and effectively disconnects the transmitter 12 from the antenna. When no obstacle is encountered by the pulses of radio energy, they travel outward without reflection, and although the horn 22 is mounted in the path of the pulses leaving the antenna, its physical size and proximity to the antenna preclude the detection by the receiver of its presence. During the time that tuning slug 28 is in the resonant cavity 26, the cavity is detuned and will not store an appreciable amount of energy.

Accordingly, the energy delivered from the receiver 20 to relay DR during the "listening" period of the radar system cycle is very small and is due only to "noise" generated in the receiver itself from shot effect, microphonics, etc. As previously explained, energy of this value is insufficient to cause the relay DR to pick up its contacts.

When the contacts of coding device CT pick up, the solenoid winding 30 is energized and as a result, the tuning slug 28 is attracted by the solenoid winding 30 and is withdrawn from the resonant cavity 26. The cavity is now tuned to the carrier frequency of the transmitter 12, and each time a pulse of radio energy is radiated from the antenna 14, a fraction of the total power is picked up by the horn 22 and is stored in the tuned cavity. After the transmitter pulse stops, the TR switch 16 operates to connect the receiver 20 to the antenna 14, and the energy which was stored in the cavity 26 is now re-radiated from the horn 22. Although the amount of power is small, the proximity of the source to the antenna 14 causes the receiver 20 to receive a sufficient signal, which decays exponentially to zero as the energy stored in the resonant cavity dissipates. The resonant cavity 26 is constructed so that the pulses of energy which it re-radiates to the antenna 14 are no stronger than the weakest reflected signal capable of producing operation of the relay DR. This signal, after being amplified and demodulated by the receiver 20, is fed to the detector relay DR. Although the duration of the individual radar signals is very short, the repetition frequency is such that substantially continuous energy is supplied to the relay DR and its contacts pick up and remain picked up.

After a time interval the contacts of coding device CT release and interrupt the circuit previously traced for energizing the solenoid winding 30, and as a result, tuning slug 28 is released from the magnetic attraction which had held it withdrawn from the resonant cavity 26 and is forced into the cavity by the biasing spring 32. As a result, cavity 26 is detuned and will no longer store energy supplied to it when the transmitter operates. The receiver now receives no signal and the supply of energy to relay DR is interrupted, and the contacts of relay DR release. After a short time interval the contacts of coding device CT again pick up and the cycle described above is repeated.

Accordingly, when no actual target is in the area searched by the radar, the radar equipment detects a "phantom" or artificial target which is provided by the resonant cavity and the equipment associated therewith, at a frequency of 180 times per minute, with the result that relay DR is picked up and released 180 times per minute.

The recurrent operation of relay DR causes energy to be supplied to the control relay CR through the decoding transformer DT, and the contacts of relay CR are held continuously picked up to establish or interrupt any desired circuits.

With the equipment operating as described above, it is assumed that a target enters the searched area. The pulses of radio energy are now reflected back from the target and are picked up by the antenna 14 and sent to the receiver 20 by the TR switch 16 during the "off" periods of the transmitter 12.

Accordingly, in addition to the signals received from the artificial target or resonant cavity 180 times per minute, the receiver 20 also detects and amplifies the signals returned from the actual target during each "off" period of the transmitter 12 for such time as the actual target occupies the searched area. Energy reflected from the actual target is received during both the tuned and detuned periods of the resonant cavity 26. The energy from the actual target received during the tuned periods of the resonant cavity supplements that supplied to the receiver 20 from the cavity 26 with the result that during the tuned periods of the cavity 26 the relay DR is picked up by energy supplied from both the phantom or artificial target and from the actual target. The energy reflected from the actual target during the detuned periods of the resonant cavity keeps the relay DR picked up during these periods in which energy is not supplied from the cavity. As a result, the detector relay DR is energized by a substantially continuous supply of energy, causing its contacts to pick up and remain picked up as long as the target is in the searched area. Since the contacts of relay DR are retained in their picked-up position, energy is no longer supplied to relay CR through the decoding transformer DT, and relay CR thereupon releases, interrupting or establishing circuits which include its contacts. When the target passes out of the searched area, reflections of radio energy from it are no longer detected, and the receiver detects only the reflections from the "phantom" target 180 times per minute. As a result, relay DR is again energized and deenergized 180 times per minute, and control relay CR is energized by energy supplied from the decoding transformer DT and its contacts pick up, thereby interrupting or establishing the control circuits governed by this relay.

The arrangement embodying our invention and shown in Fig. 1 is such that operation of all portions of the radar equipment are continuously checked so that failure of any element in the radar equipment which might result in the non-detection of a target is promptly disclosed and causes the control relay CR to become deenergized. With the equipment operating and without a target in the area, it is assumed for purposes of illustration that a failure of the equipment occurs, for example, a failure of the receiver, such as an open circuit.

Although the transmitter continues to operate and the "phantom" target continues to cause reflected energy to be returned to the radar equipment 180 times per minute, energy is not supplied to relay DR due to the failure of the receiver, and the contacts of relay DR release and remain released. The cessation of the recurrent motion of the contacts of relay DR deprives relay CR of eregy supplied through the decoding transformer DT, and its contacts release. Accordingly, the failure of the receiving equipment produces a result similar to the actual presence of a target, and this condition is safer than the non-detection of a target.

Although we have described the effect of a failure of operation of the equipment due to a failure of the receiver, it will be seen that any other failure of the equipment, such as a failure of the transmitter, the coding device CT or other parts of the "phantom" target, will cause the detector relay DR to be continuously energized or deenergized, and thereby cause the release of relay CR.

As previously explained, the resonant cavity 26 is constructed so that the pulses of energy supplied therefrom to the antenna 14 during the tuned periods of the cavity are smaller in value than the weakest impulses reflected from an actual target and capable of producing operation of the relay DR. Accordingly, if a defect should occur in the equipment and should render it insensitive to weak pulses reflected from a distant target, the energy supplied from the phantom target will also be insufficient to produce operation of the relay DR. The relay DR, therefore, will be continuously released and the relay CR will release.

The transmitter 12 is adjusted so that the value of energy in the transmitted pulses 18 is such that after reflection from an aircraft at the extreme range at which the equipment operates, the reflected pulses of energy supplied to the receiver 20 exceed a certain predetermined value. Since the value of the pulses returned from the cavity resonator 26 during its tuned periods will be smaller in value as explained above, it will be seen that if these pulses are capable of producing operation of the relay DR, it is certain that the stronger pulses returned from the aircraft will produce operation of the relay DR.

In order that the operation of the equipment described above may be better understood, we have shown in the drawings time charts showing the relationships of the various operating elements of the equipment.

Figures 2, 3:
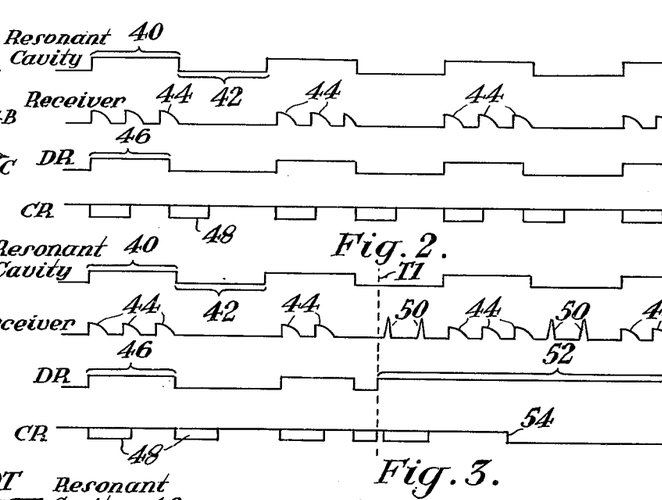
Figs. 2, 3 and 4 are time charts showing the relationship of various operating elements of the system shown in Fig. 1.

Referring to Fig. 2 of the drawings, there is shown a time chart of the operation of the resonant cavity 26, the receiver 20, the detector relay DR, and the control relay CR, during a period in which no target is present in the searched area. As shown, the resonant cavity 26 is tuned and detuned at regularly spaced intervals, and has tuned periods 40 and detuned periods 42 of substantially equal duration. During the time that the resonant cavity is tuned, a portion of the radio energy in each pulse is stored in the cavity and is returned to the receiver after the transmitter is shut off. The energy delivered from the resonant cavity to the receiver reaches a maximum in an extremely short time after the transmitter ceases to supply energy, after which it decays exponentially to zero. The pulses of energy 44 received from the resonant cavity are shown as they appear at the input terminals of the receiver 20. Although for the sake of clarity only a few pulses are shown as being received during each tuned period of the resonant cavity, it is to be understood that actually hundreds of thousands of impulses may be received, depending upon the pulse repetition rate of the radar equipment. The envelope 46 of these pulses as delivered to relay DR will be approximately rectangular in shape and will have a frequency corresponding to that of the tuned periods of the resonant cavity 26.

During the detuned periods of the resonant cavity 26 the pulses of energy travel outward from antenna 14, but since no target is assumed to be present in the searched area, there will be no reflection of energy from either a natural or the artificial target, and as a result no energy is supplied to the relay DR from the receiver 20 and the contacts of relay DR release.

The operation of the contacts of relay DR as a result of energy supplied thereto from the receiver 20 causes an impulse of energy 48 to be delivered to the control relay CR from the decoding transformer DT each time the contacts of relay DR pick up or release. The relay CR is of a type which is slow in releasing its contacts and will not release during the normal intervals in the supply of energy from the decoding transformer DT. The relay CR is also of a type which is slow in picking up its contacts in order that it will not pick up in response to a single change in the position of the contacts of relay DR when they move from one position to the other but do not continue operating.

Referring to Fig. 3, it will be noted that the left-hand portion of the chart shows the operation of the equipment in the normal manner as shown in Fig. 2. However, it is assumed that a target enters the searched area at the time Tf, as indicated by the dotted line.

After a target enters the searched area, pulses of radio energy 50 reflected from the target are then present at the input terminals of the receiver during both the tuned and detuned periods of the resonant cavity 26. In addition, during the tuned periods of the resonant cavity, impulses of energy 44 reflected from the cavity 26 are also supplied to the input terminals of the receiver.

In Fig. 2 of the drawings the pulses 44 are shown at the input terminals of the receiver 20 during the tuned periods of the resonant cavity, but it is to be understood that the reflected pulses of energy 50 are also present.

The envelope 52 of the energy supplied to the winding of relay DR is continuous during the time that the target is in the searched area. Accordingly, the contacts of relay DR are then retained in their picked-up position, and impulses of energy 48 are no longer supplied to the relay CR from the decoding transformer DT, and after a short time interval the contacts of relay CR release at the point indicated at 54.

Figure 4:
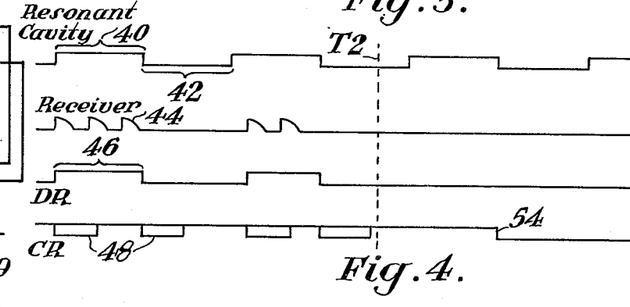

Referring to Fig. 4, it will be noted that the left-hand portion of the chart shows the operation of the equipment in a normal manner as shown in Fig. 2. However, it is assumed that at the time T2, with no actual target in the searched area, a failure of the radar equipment occurs in such manner as to disable the receiver so that the impulses of radio energy 44 returned from the resonant cavity are no longer received. The failure of the receiver interrupts the supply of impulses of energy 46 to the relay DR and the contacts of this relay release and remain released. As a result, the impulses of energy 48 supplied to the relay CR from the decoding transformer DT cease, and after a time interval the contacts of relay CR release at the point 54.

As explained above, failure of any other portion of the equipment will result in cessation of operation of the relay DR and consequent release of the relay CR.

Although we have described our invention as being used with a microwave radar system, it is to be understood that such an arrangement will operate equally as well at lower radio frequencies. In such cases some type of resonant circuit having lumped parameters may be substituted for the resonant cavity as an energy storage device. Also it is to be understood that the system will work equally as well with other types of radiant energy object detection systems, using appropriate reflectors.

Figure 5:
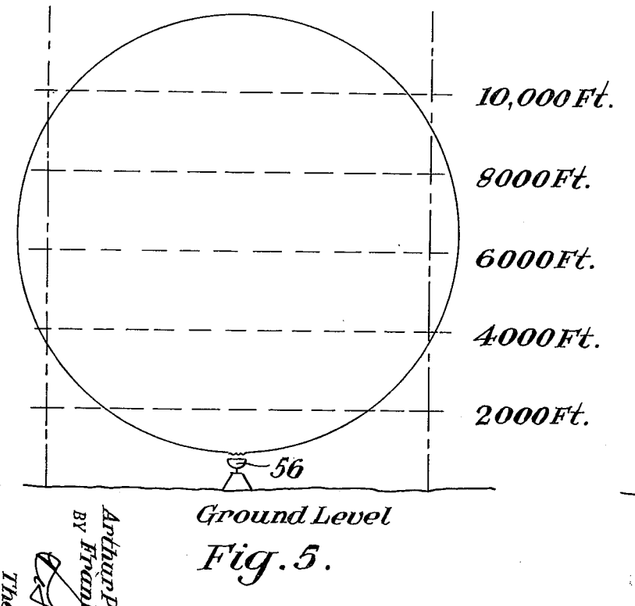
Fig. 5 is a diagram showing the elevation of an airway lane having an arrangement of equipment as shown in Fig. 1 for the detection for aircraft within a substantially definite area.

In Fig. 5 we have shown the application of a radar system embodying our invention to a section of an airway traffic lane for the purpose of detecting the occupancy of that section. The apparatus 56 projects a beam having a radiation pattern which, as shown, is arranged to cover the area to be searched, the area in this case being small enough that a stationary beam will have a large enough pattern to cover such area.

Figures 6, 7:
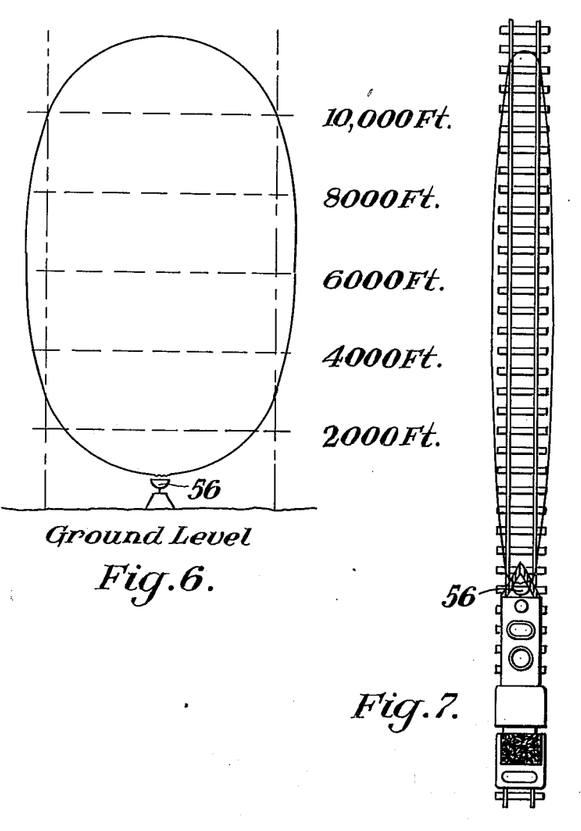
Fig. 6 is an end view of Fig. 5.
Fig. 7 is a diagram illustrating the application of the equipment shown in Fig. 1 to a railway locomotive for the detection of objects ahead.

Fig. 6 is an end view of the lane shown in Fig. 5, and shows the configuration of the beam as seen looking down the center line of the airway lane.

Fig. 7 is an illustration of an arrangement of radar equipment 56 on the front end of a railway locomotive. The equipment is arranged so that a pencil-like beam is projected ahead of the locomotive for the detection of objects. Our invention is especially applicable to render the operation of such an arrangement safe. It is contemplated that the radar equipment 56 will incorporate the checking means provided by this invention so that any failure of the radar equipment to operate as intended will produce the same indication on the locomotive as is produced when the radar equipment detects an obstruction. This arrangement permits the engineer to rely on the radar equipment since this equipment, if operating as intended, will warn the engineer of obstructions in advance, and the engineer will also be warned if the radar equipment is not operating as intended.

Figure 8:
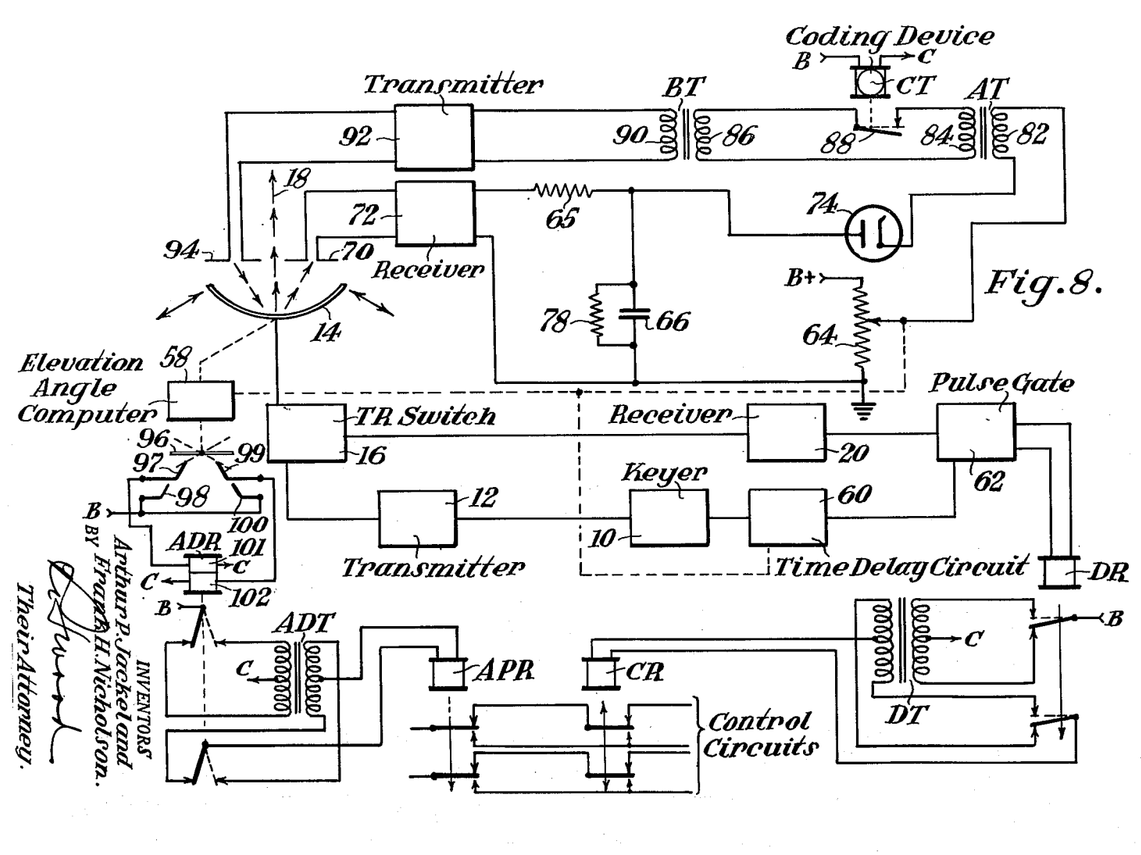
Fig. 8 is a diagram showing a radar system embodying our invention wherein targets at a given nominal range only are detected.

In Fig. 8 we have shown a modification of our invention arranged to check the operation of a radar system designed to detect aircraft within a given altitude zone only.

It is well known to those skilled in the art that the slant range, or direct distance from the radar to the target, may be accurately determined by measuring the time required for a pulse of energy to travel out to the target and return as a reflection to the radar. If this time is known, then the slant range R of the target in meters is found by the equation $$R = \frac{VT}{2}$$

where V is the substantially constant velocity of radiation of approximately $3 \times 10^8$ meters per second, and T is the time in seconds. For a radar system to detect targets at a given slant range, it is obvious from the above equation that the radar system must select pulses which return to the set at a given time and at that time only. Such an arrangement may be provided by the use of pulse gates, well known to the art, which permit the receiver, or equipment associated with the receiver, to function for a very small interval of time at a selected time after the outgoing pulse has been transmitted.

If at the time the gate is open, a reflected pulse is received, the receiver will pass the pulse to the associated equipment, while reflected pulses received when the gate is closed are effectively blocked. Accordingly, the radar equipment will detect targets at various ranges, but only those at one definite range will be passed to operate an indicator or other device.

In a radar system for detecting aircraft, since the slant range of the target may be accurately determined, it will be seen that the altitude of the target may be determined by the equation $$H = R \sin \theta$$

where H is altitude in feet, R is slant range in feet and $\theta$ is the angle in degrees of elevation of the antenna above the horizontal when pointed directly at the target.

In the system shown in Fig. 8, since the antenna 14 is oscillated to sweep or scan the beam back and forth over a certain area, it follows that the angle of elevation $\theta$ will be constantly changing, and in order to detect aircraft at a given altitude zone at all times during the scanning, the timing of the pulse gate previously described must be varied in accordance with the variations in the elevation angle. This may be accomplished by any of several methods well known in the art, several such methods being shown and described by Edwin G. Schneider in an article titled "Radar" on pages 528 to 578 of the Proceedings of the Institute of Radio Engineers, vol. 34, No. 8, August 1946.

In the system shown in Fig. 8, there is provided a radar system embodying our invention similar to that shown and described in Fig. 1, but so modified as to detect aircraft in a vertical zone at a given nominal altitude and also within a predetermined distance above or below this nominal altitude. The antenna 14 is constructed and arranged so that it is oscillated in an arc by a suitable mechanism, not shown, so that the projected beam recurrently scans the area to be searched. The elevation angle computer 58 continuously ascertains the sine of the angle of elevation of the antenna and by suitable mechanical or electrical means supplies this information to the time delay circuit 60. The time delay circuit 60 functions to delay the application of a control pulse fed from the keyer 10 to the pulse gate 62, and also serves to vary the duration of this pulse.

As previously pointed out, if the altitude of the searched zone is to be constant, then the slant range determining means of the radar must be varied in accordance with the angular deviation of the antenna. The phantom or artificial target must be arranged so that the reflection of pulses produced by it appear substantially the same to the radar equipment as those produced by an actual target in the searched zone. Accordingly, the time required for the return of a pulse from the artificial or phantom target must vary similarly to the variation of the reflection time of an actual target due to constant variation in the slant range as the target approaches, passes over, and recedes from the radar. Accordingly, the angular deviation of the antenna determined by the computer 58 is introduced in a time delay circuit by the potentiometer 64, which varies the bias voltage of the tube 74 in the time delay circuit of the phantom target which will be explained subsequently.

The control relay CR is energized from decoding transformer DT, and as explained in connection with Fig. 1, is energized when and only when the detector relay DR is responding to coded energy.

Since the altitude zone in the area to be searched must be continuously scanned by the radar beam, it is necessary to provide a check of the proper scanning operation of the antenna 14. In Fig. 8 we have illustrated one method which may be used to accomplish this check. The contact operating member 96 is oscillated by the operation of the antenna 14, and is arranged so that it closes contacts 97 and 98 only when the antenna 14 is in one extreme position and closes contacts 99 and 100 only when the antenna 14 is in its other extreme position. These contacts establish circuits to energize windings 101 and 102 of a polar stick relay ADR to operate its contacts to their left-hand or normal position and to their right-hand or reverse position. As long as the antenna 14 is oscillating between its two extreme positions, the contacts of the scanning detector relay ADR operate and supply energy to the auxiliary relay APR through the decoding transformer ADT. Should the antenna 14 stop in any position, the contacts of relay ADR will no longer operate and relay APR will release due to the interruption of energy supplied from the decoding transformer ADT. The relay APR cooperates with the relay CR to govern the control circuits, and it is contemplated that these circuits will show that the searched zone is vacant only when relays APR and CR are both picked up.

The artificial or phantom target arrangement consists of a receiving antenna 70 feeding a receiver 72 whose output is supplied to a time delay circuit. The time delay circuit includes the resistors 65, 78, variable potentiometer 64, capacitor 66 and the vacuum tube 74. The cathode of tube 74 is connected through the primary winding 82 of transformer AT to the movable contact of potentiometer 64, one terminal of which is connected to ground, and the other terminal of which is connected to a source of high voltage direct current, not shown, whose positive terminal is denoted by B+, and whose negative terminal is grounded. The secondary winding 84 of transformer AT supplies energy to the primary winding 86 of transformer BT over a contact 88 of coding device CT, while the secondary winding 90 of transformer BT supplies energy to a low powered transmitter 92, having a carrier frequency the same or substantially the same as that of the main transmitter 12 so that the receiver 20 will respond to energy supplied from transmitter 92. The transmitter 92 is constructed and arranged so that the impulses of energy which it returns to the antenna 14 are no stronger than the weakest signals reflected from an actual target and capable of producing operation of relay DR. Transformer AT serves as an isolating transformer to insure that energy is not supplied to transformer BT should a short circuit or other derangement cause an increase in the flow of energy through its primary winding at an improper time. Transformer BT serves as a step-up transformer to supply high voltage power to the transmitter 92. The output of transmitter 92 is radiated by an antenna 94. The antennas 70 and 94 are arranged so that they lie within the radiation pattern of the main antenna 14, and are mounted so that they maintain their positions with respect to the main antenna 14 as it oscillates while scanning.

In describing the normal operation of the equipment in Fig. 8, it is assumed that no aircraft is in the area and altitude searched by the radar equipment and that the equipment is functioning as intended. At this time transmitter 12 is modulated by keyer 10 to deliver pulses of radio energy to antenna 14 through TR switch 16. As these short pulses of radio energy supplied from transmitter 12 travel outward from the antenna 14, some energy from each pulse is picked up by the receiving antenna 70 and is fed to the receiver 72 where it is demodulated and amplified. The resulting direct current pulse is fed from the receiver 72 to the condenser 66 through the resistor 65. As a result the condenser 66 is charged at a rate dependent on the resistance of resistors 65 and 78 and the capacitance of the condenser 66. The cathode of tube 74 has a bias voltage which is dependent upon the position of the movable contact of potentiometer 64. The various elements of the equipment are arranged and proportioned so that each pulse of energy picked up by the antenna 70 causes the receiver 72 to supply to condenser 66 energy effective to build up the voltage in the condenser to a value high enough to render the tube 74 conducting irrespective of the bias on the tube. The tube 74 is normally non-conducting, but when the voltage across the condenser 66 rises above the value of the bias voltage, the tube 74 will conduct, and will continue to conduct while the voltage of the condenser is higher than the bias voltage.

Since the tube 74 does not become conducting until the voltage across the condenser 66 exceeds the bias voltage on the tube 74, and as the bias voltage on the tube 74 is governed by the elevation angle computer 58 through the potentiometer 64, it follows that the time interval which must elapse from receipt of an impulse by antenna 70 until tube 74 becomes conducting varies in accordance with the angular position of the main antenna 14.

After tube 74 becomes conducting the energy stored in condenser 66 flows from the plate to the cathode of tube 74, through the primary winding 82 of transformer AT, and through the potentiometer 64 to ground. The tube 74 continues to conduct as long as the voltage across the condenser 66 exceeds the bias voltage on the tube. When the voltage across the condenser 66 decreases below the bias on the tube 74, the tube ceases to conduct and energy in the condenser 66 is thereafter dissipated through the resistor 78 which is proportioned to cause the charge on the condenser 66 to reduce to zero or to a low ineffective value before the next impulse of energy is supplied from the receiver 72.

The pulse of energy flowing through the primary winding 82 of transformer AT in the period in which tube 74 is conducting causes an impulse of energy to be induced in the secondary winding 84 of transformer AT. When tube 74 ceases to conduct, energy stops flowing in the primary winding 82 of transformer AT, and a pulse of energy is again induced in the secondary winding 84 of transformer AT, but is of opposite polarity to that induced by the flow of energy through the primary winding 82.

At this time it is assumed that the contact 88 of coding device CT is in its first or open position and as a result the circuit controlled by this contact for supplying energy from the secondary winding 84 of transformer AT to the primary winding 86 of transformer BT is interrupted, and the energy induced in the secondary winding of transformer AT is not fed to the primary winding 86 of the transformer BT. Accordingly, the transmitter 92 does not receive any energy from the secondary winding 90 of transformer BT and no radio energy is supplied from transmitter 92 to the transmitting antenna 94.

Simultaneously with the delivery of a pulse from keyer 10 to transmitter 12 to cause transmitter 12 to transmit a pulse of radio energy, a control pulse is also fed to a time delay circuit 60 which may be arranged similarly to that shown in the phantom target arrangement. After a delay interval determined by the elevation of the antenna 14, this pulse is fed from the time delay circuit 60 to the pulse gate 62 to cause it to permit energy which is received and amplified by receiver 20 to pass to detector relay DR. The time delay interposed by the time delay circuit 60 is equivalent to the time which would be required for a pulse of energy to travel to and be reflected from a target within the altitude zone for which this equipment is adjusted. At this time, however, since it is assumed that no target is in the area searched there are no resulting reflections, and when the pulse gate 62 is caused to conduct by the control pulse fed through the time delay circuit 60 from keyer 10 the receiver does not operate to cause energy to be fed through the pulse gate 62 to relay DR, and as a result relay DR is deenergized and released.

After a time interval which is relatively long compared with the repetition rate of the radar equipment the contact 88 of coding device CT moves to its second or closed position and accordingly a pulse of energy is supplied to the primary winding 86 of transformer BT each time that the receiver 72 detects a pulse of energy radiated from antenna 14. Energy induced in secondary winding 90 of transformer BT then causes transmitter 92 to operate so that a short pulse of radio energy is radiated from antenna 94. This pulse of energy is picked up by antenna 14 and is supplied to receiver 20 through TR switch 16, which at that time is in the condition to permit energy pulses received from antenna 14 to be diverted to receiver 20. At this time also the pulse which was delivered from keyer 10 to the time delay circuit 60 has arrived at pulse gate 62, so that pulse gate 62 is in such a condition that an impulse of energy received in the receiver 20 will be amplified and demodulated and fed to the detector relay DR. As a result, relay DR is energized and its contacts pick up. This condition continues as long as contact 88 of coding device CT remains in its second or closed position and the repetition rate of the impulses supplied from the phantom target to relay DR is such that the contacts of relay DR remain steadily picked up.

After a time interval the contact 88 of coding device CT moves to its first or open position in which it interrupts the supply of energy to the primary winding 86 of transformer BT with the result that pulses of energy are no longer radiated from antenna 94. Accordingly, receiver 20 no longer receives impulses from the antenna 14 and as a result relay DR is deenergized and its contacts release. After a short time interval contact 88 of coding device CT is again picked up and the cycle above described is repeated. The continued recurrence of the pick-up and release of contact 88 of coding device CT causes a similar operation of the contacts of detector relay DR through the arrangement previously described. This operation of the contacts of relay DR causes energy to be fed to the control relay CR through the decoding transformer DT, and as a result the relay CR is held energized and its contacts are picked up, establishing or interrupting various circuits which include its contacts as well as contacts of relay APR.

Since the antenna 14 is in constant motion scanning the area to be searched, its elevation angle likewise is constantly changing. The elevation angle computer 58 causes the movement of the antenna 14 to be translated into mechanical motion which operates the movable contact of the potentiometer or variable resistor 64. This mechanical motion is also applied to the time delay circuit 60 to actuate a similar device therein to cause the pulses from keyer 10 to be delayed more or less by an amount which is proportional to the angle of elevation, thus establishing a constant altitude component in the detection system.

The time delay circuit 60 is provided to render the pulse gate 62 effective to supply energy to the relay DR when and only when energy is supplied from the receiver 20 as a result of energy reflected from a natural target in the selected altitude zone, or from the artificial or phantom target, and to prevent the supply of energy to relay DR when energy is supplied from the receiver 20 as a result of energy reflected from a target outside the selected zone.

In order for the pulse gate 62 to function as intended it must be governed so that in each position of the antenna 14, after an impulse of energy has been transmitted from the antenna, the pulse gate will remain closed until the impulse has had time to travel to and return from the nearest side of the altitude zone being searched. After the expiration of this time interval the pulse gate must be opened and must then remain open long enough to permit an impulse reflected from the farthest side of the altitude zone being searched to return, whereupon the pulse gate must be closed.

When the searched portion of the zone is directly above the antenna 14 the time required for a pulse to be reflected from the nearest side of the searched zone is the minimum, and the time delay circuit 60 is arranged so that in this position of the antenna 14 the period during which opening of the pulse gate 62 is delayed is also the minimum. Similarly, at this time the difference in the time required for a pulse to be reflected from opposite sides of the searched zone is the minimum and the period during which the pulse gate 62 must remain open is also the minimum.

On the other hand, when the searched portion of the zone is at the extreme end of the searched area, the time required for a pulse to be reflected from the nearest side of the searched zone is the maximum and is substantially greater than is required for a pulse to be reflected when the portion of the searched zone is directly overhead. Accordingly, when the portion of the searched zone is at the extreme end of the searched area, the period during which opening of the pulse gate 62 is delayed is the maximum.

In addition, when the portion of the searched zone is at the extreme end of the searched area the difference in the time required for a pulse to be reflected from opposite sides of the searched zone is the maximum and the period during which the pulse gate 62 must remain open is also the maximum.

In like manner, as the antenna 14 moves throughout its range of movement, the time interval during which opening of the pulse gate 62 is delayed, and the period during which it remains open after being opened, must be continuously varied in accordance with the angular position of the antenna.

Accordingly, the time delay circuit 60 which is governed by the elevation angle computer 58 is arranged so that it operates both to delay the time of the opening of the pulse gate 62 and to vary the length of its open periods in accordance with variations in the elevation angle of the antenna 14.

Also, to provide for the return of an impulse of energy from the phantom target arrangement at the time when the pulse gate 62 is open, the transmission of an impulse of energy from the transmitter 92 after the receiver 72 receives an impulse of energy from the main antenna 14 must be delayed until such time as the pulse gate 62 is open. As previously pointed out, this impulse must be delayed by the amount of time required for an impulse of energy to travel out to, and to return from, a target in the searched area. Since this time varies, depending on whether the area being searched is directly overhead, or at the extreme limits of the searched zone, it follows that the time interval by which the return impulse from the phantom target is delayed must be varied in accordance with the angle of elevation of the antenna.

The bias voltage applied to the cathode of tube 74 is varied by the potentiometer 64 in accordance with the position of the antenna 14 as determined by the computer 58, so that the point at which the voltage of the condenser becomes high enough to overcome the bias voltage to cause the tube 74 to conduct is varied in accordance with the angle of elevation of the antenna. The time required for condenser 66 to charge remains the same at all times but because of changes in the potentiometer 64 the time at which the voltage across the condenser is sufficient to cause tube 74 to conduct will vary in accordance with the angle of elevation of the antenna 14.

As explained above the time at which the phantom target equipment supplies energy to the receiver 20 is governed by the time at which the tube 74 is rendered conducting. The various parts of the phantom target equipment are arranged and proportioned so that in each position of the antenna 14 the impulses supplied by the phantom target to the receiver 20 are delayed by an amount such as to cause the receiver to supply an impulse of energy to the pulse gate 62 during the period in which the pulse gate has been opened by a control pulse supplied from the time delay circuit 60. Accordingly, the energy supplied by the phantom target during the closed periods of coding device contact 88 causes the receiver 20 to supply energy through the pulse gate 62 to pick up the contacts of the relay DR.

With the equipment operating as described above, it is now assumed that an aircraft enters the area searched by the radar, and within the particular altitude zone for which the equipment is adjusted. At this time, as the radar beam encounters the aircraft, reflections are received by the radar equipment after each pulse is transmitted. Following transmission of each main pulse, a reflected pulse is received after a time interval which is proportional to the slant range of the aircraft. After being detected and amplified by the receiver 20 the pulse received from the aircraft is then passed to the pulse gate 62.

As explained above, in all positions of the antenna 14 the time delay circuit 60 supplies to the pulse gate 62 impulses of energy at such time and for such duration as to cause the pulse gate 62 to be open when the reflected pulse from the actual target is received and is supplied from the receiver 20 to the pulse gate 62. Accordingly, as a result of energy reflected from the aircraft, the energy supplied from the receiver 20 to the pulse gate 62 is passed on to the relay DR.

As explained above, the antenna 14 is continuously oscillated through its range of movement so as to search a zone of substantial area. An aircraft is relatively small in comparison with the searched zone with the result that pulses of energy are reflected therefrom to the antenna only during a small portion of the time required for the antenna to move from one extreme position to the other. The equipment is arranged so that the energy supplied from the pulse gate 62 to the relay DR as a result of energy reflected from the target during each sweep or movement of the antenna 14 is sufficient to pick up the contacts of the relay DR. The various parts of the equipment are arranged so that the frequency of oscillation of the antenna 14 is substantially greater than the frequency of operation of contact 88 of coding device CT with the result that when the searched zone is occupied several impulses of energy are supplied to relay DR during each open period of coding device contact 88. The relay DR is of the code following type, and although its contacts are biased to their lower or released position so that they move to this position when the relay winding is deenergized, its contacts are somewhat slow in releasing so they do not move to their released position immediately upon interruption of the supply of energy to the relay winding. The various parts of the equipment including the rate of operation of the antenna 14, the duration of the energy impulses supplied from pulse gate 62 to relay DR each time an actual target reflects energy to the antenna, and the release time of the relay DR are arranged and proportioned so that when an actual target is in the searched zone the contacts of relay DR will be picked up and will remain picked up in the intervals between energy impulses.

As long as an actual target is present in the searched zone energy reflected from this target during both the open and closed periods of the contacts 88 of coding device CT causes energy to be supplied through the receiver 20 to pulse gate 62 and thus to the relay DR to pick up its contacts and keep them picked up. In addition, during the closed periods of contact 88 of coding device CT energy pulses supplied by the phantom target also cause energy to be supplied through the receiver 20 to the pulse gate 62 and thence to the relay DR. Accordingly, as long as an actual target is in the searched area the relay DR is continuously picked up, the relay being energized solely as a result of energy reflected from the actual target during the open periods of contact 88 of coding device CT, and during the closed periods of contact 88 being energized as a result of energy reflected from the actual target and of energy supplied from the phantom target.

Since the contacts of relay DR are continuously picked up when an actual target is in the searched zone, energy is not supplied through the transformer DT to relay CR and its contacts release to interrupt the circuits which show that the searched area is vacant and to establish circuits which show that the searched area is occupied.

After the aircraft departs from the searched zone pulses of energy are no longer reflected therefrom to the antenna 14. However, during the closed periods of contact 88 of coding device CT, the artificial or phantom target apparatus continues to supply impulses of energy to the antenna 14. Accordingly, after the aircraft departs from the searched zone energy is no longer supplied through the receiver 20 and pulse gate 62 to relay DR during the open periods of contact 88 of the coding device CT and the contacts of relay DR release. After the aircraft departs from the searched zone energy continues to be supplied by the phantom or artificial target equipment during the closed periods of contact 88 of coding device CT and causes the relay DR to pick up. The recurrent movement of the contacts of the relay DR between their two positions causes energy to be supplied through the decoding transformer DT to relay CR and its contacts pick up to interrupt the circuits governing the occupied indication and to establish the circuits governing the clear indication.

The equipment embodying our invention as shown in Fig. 8 is arranged so that any failure of the equipment which might result in the non-detection of a target is disclosed and causes the control relay CR to become deenergized. With the equipment operating in its normal manner, and without a target in the area, it is assumed for purposes of illustration that a failure of the receiver 20 occurs, such as an open circuit.

Although the transmitter will continue to operate, and the phantom target arrangement causes impulses of energy to be returned to the radar equipment during the closed periods of contact 88 of the coding device CT, energy will not be delivered to the detector relay DR because of failure of the receiver 20. As a result, the contacts of relay DR release and remain released and energy is no longer supplied through the decoding transformer DT to the relay CR. Accordingly relay CR is deenergized, opening the circuits controlled over its contacts, and producing a result similar to the actual detection of the target.

Similarly, a failure of the transmitter, the phantom target equipment, or any other portion of the equipment will cause the relay DR to be either continuously energized or continuously deenergized, with the result that energy is no longer supplied to the relay CR from the decoding transformer DT. As a result, the relay CR will release, interrupting the circuits controlled by its contacts to thereby indicate that an unsafe condition exists.

As previously explained, the transmitter 92 is constructed so that the pulses of energy supplied therefrom to the antenna 14 during the closed periods of contact 88 of coding device CT, are smaller in value than the weakest impulses reflected from an actual target and capable of producing operation of relay DR. Accordingly, if a defect should occur in the equipment and should render it insensitive to weak pulses reflected from a distant target, the energy supplied from the phantom target will also be insufficient to produce operation of the relay DR. The relay DR, therefore, will be continuously released and the relay CR will release.

In addition, the equipment continuously checks not only that the radar equipment is functioning, but also checks that the radar equipment is searching the proper altitude zone. As explained above, the time delay circuit 60 is governed by the elevation angle computer 58 and controls the pulse gate 62 so as to render the pulse gate effective to pass energy from the receiver 20 to the relay DR only at selected intervals, the time of occurrence and the duration of which are determined by the distance from the antenna 14 to the searched zone. This insures that energy will be supplied to relay DR as a result of energy reflected from an aircraft in the searched altitude zone, but will not be supplied to relay DR as a result of energy reflected from an aircraft outside the searched zone.

If for any reason the time delay circuit 60 fails to operate as intended and does not render the pulse gate 62 effective to supply energy from the receiver 20 to the relay DR at the proper time at which energy reflected from an aircraft in the searched altitude zone is received, the relay DR will not be picked up by this energy.

As explained above, during the closed periods of contact 88 of coding device CT the artificial or phantom target supplies impulses of energy to the antenna 14 to cause the receiver 20 to supply energy through the pulse gate 62 to relay DR when and only when the pulse gate 62 is rendered effective to pass energy. The artificial or phantom target apparatus is governed by the elevation angle computer 58 in such manner that the impulses of energy supplied by the phantom target to the antenna 14 occur at times such as to cause receiver 20 to supply energy to the pulse gate 62 during the periods in which the pulse gate 62 should be conditioned to permit energy to pass from receiver 20 to relay DR. If, because of defective operation of the time delay circuit 60, the pulse gate 62 is not "open" at the proper time, the energy supplied from receiver 20 as a result of energy supplied from the phantom target will not be supplied to the relay DR and its contacts will not pick up during the closed periods of coding device CT.

Under the conditions outlined, the relay DR will remain released continuously and will not cause energy to be supplied through the transformer DT to relay CR and it will release to discontinue the display of the clear indication.

If the defect in the operation of the time delay circuit 60 is such that it causes pulse gate 62 to be open too soon or too late, the pulse gate will permit to be supplied to relay DR energy supplied by receiver 20 as a result of energy reflected from an aircraft at an altitude below or above the designated zone. This energy will be supplied to the relay DR regardless of whether contact 88 of coding device CT is open or closed and will keep the relay DR continuously picked up with the result that relay CR is released.

In like manner, if the artificial or phantom target equipment is not functioning properly and fails to supply energy impulses to the antenna, or supplies energy impulses at an incorrect time, the receiver 20 will not cause energy to be supplied to the relay DR during the closed periods of contact 88 of coding device CT. As a result, the relay DR will be continuously released as long as the searched zone is vacant, and will be continuously picked up when the searched zone is occupied. In either case, the relay CR remains continuously released and prevents improper display of a clear indication.

As previously explained, should the antenna 14 stop oscillating, the detector relay ADR no longer operates and thus deprives the auxiliary relay APR of energy. Release of the contacts of relay APR will also denote an unsafe condition.

Figure 9:
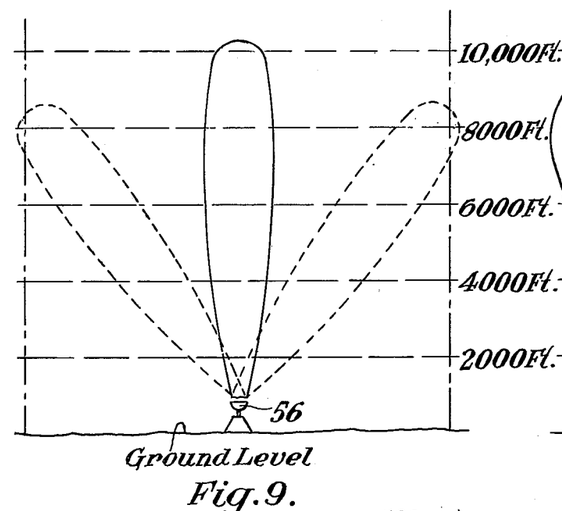
Fig. 9 is a diagram showing the elevation of an airway lane having an arrangement of equipment as shown in Fig. 8 for the detection of aircraft at a given nominal altitude within a substantially definite area.
Figure 10:
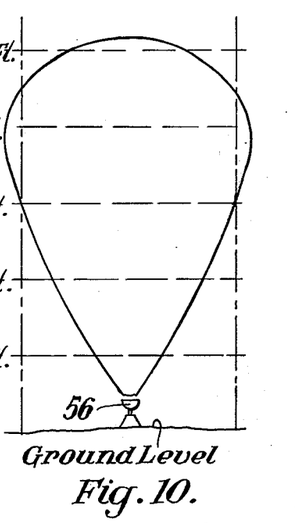
Fig. 10 is an end view of Fig. 9.

In Fig. 9 we have shown an elevation of an airway lane having a radar system embodying our invention for the purpose of detecting planes therein. The equipment 56 projects a beam which is fan-shaped having its narrow dimension perpendicular to the direction of the traffic in the airway, and as shown, covers the area by scanning. Fig. 10 is an end view of Fig. 9 and shows the beam as having a pattern sufficiently broad to cover the width of the airway lane at the altitude for which the equipment is adjusted.

In order that the operation of the equipment described above may be better understood, we have shown in the drawings time charts showing the relationship of the operation of the various parts of the equipment.

Figure 11:
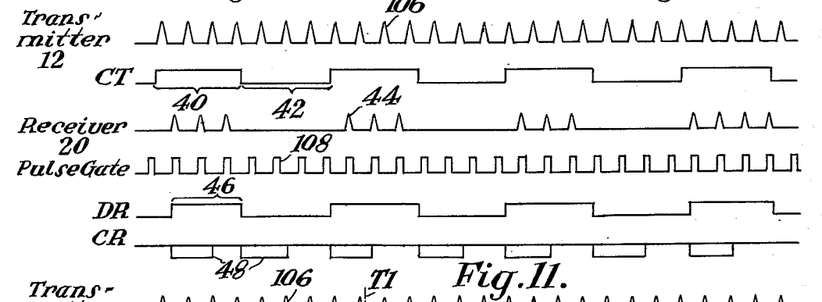
Figs. 11, 12 and 13 are time charts showing the relationship of various operating elements of the system shown in Fig. 8.

Referring to Fig. 11 of the drawings, there is shown a time chart of the operation of the transmitter 12, the coding device CT, the receiver 20, the pulse gate 62, the relay DR, and the relay CR, during the time that no target is present in the searched area.

As shown, the transmitter 12 in Fig. 8 operates to continuously transmit short pulses of radio energy 106. The contact 88 of coding device CT has substantially equal "on" or closed and "off" or open periods 40 and 42, respectively. During the "on" periods 40 of the coding device CT, pulses of energy 44 are re-radiated to the receiver 20 by the phantom target equipment previously described, and these pulses 44 are supplied by the receiver and are passed to the pulse gate 62. The pulse gate 62 continuously receives control pulses 108 from the keyer 10 after they have been delayed by the time delay network 60. Accordingly, the pulses of energy supplied from the receiver 20 are passed by the pulse gate 62 to the detector relay DR. Although for the sake of clarity only a few of the radar pulses are shown as being transmitted and received during an "on" period of the coding device CT, it is to be understood that actually there may be hundreds or thousands of impulses received during a single "on" period of the coding device CT, depending on the pulse repetition rate of the radar equipment.

Figure 12:
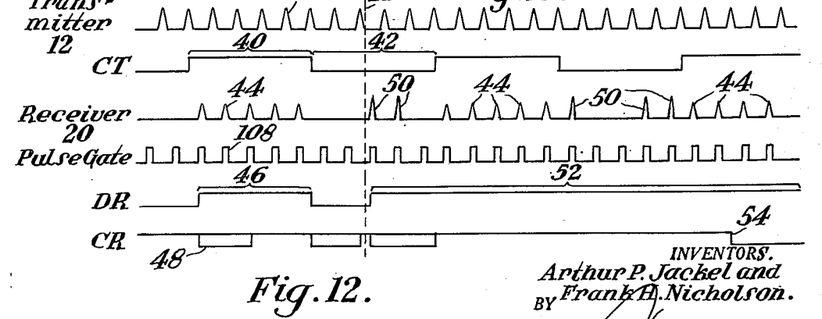

Similarly, only a few of the control pulses 108 which are supplied to the pulse gate 62 are shown in Figs. 11 and 12 of the drawings, but it should be understood that one such control pulse is supplied for each impulse transmitted by the radar equipment. In addition, in Figs. 11 and 12 of the drawings the control pulses 108 are shown as occurring at uniform intervals and to be of uniform duration. However, as explained above, the time of occurrence of the control impulses, and the duration of these control pulses, are continuously varied in accordance with the angular position of the antenna 14. As explained above, the antenna 14 operates at a rate such that it moves from one extreme position to the other several times within one closed or one open period of contact 88 of coding device CT. Hence the control pulses 108 pass through several cycles of variation in length and duration during each half-cycle of operation of the coding device CT, and in the space available in the drawings it is impractical to illustrate these variations in the control impulses.

The rate at which the radar pulses are transmitted and received, and therefore the rate at which impulses are supplied through the pulse gate 62 to relay DR, is so rapid that the energy supplied to the relay DR may be considered to be continuous throughout the closed periods of contact 88 of coding device CT. The envelope 46 of these pulses as delivered to relay DR is approximately rectangular in shape and has a frequency substantially the same as that of the coding device CT. The operation of the contacts of relay DR causes an impulse of energy 48 to be delivered to the control relay CR from the decoding transformer DT each time the contacts of relay DR move to one position or the other. The relay CR is of a type which is slow in releasing its contacts, and will not release during the normal intervals between the impulses of energy supplied from the decoding transformer DT.

Referring to Fig. 12, it will be noted that the left-hand portion of the chart shows the operation of the equipment in the normal manner as shown in Fig. 11. However, it is assumed that a target in the form of an airplane enters the searched area at the time T1 as indicated by the dotted line.

After the aircraft enters the searched area impulses of energy 44 continue to be supplied to the receiver 20 by the phantom or artificial target apparatus during the closed periods of the contact 88 of coding device CT. In addition, after the aircraft enters the searched area impulses of energy 50 are supplied to the receiver 20 in the intervals during which the antenna 14 is directed upon the aircraft. The impulses 50 which result from energy reflected from the aircraft are supplied to the receiver 20 during both the open and closed periods of contact 88 of coding device CT. During the closed periods of coding device contact 88 the impulses 50 from the actual target augment ro supplement the impulses 44 from the phantom target, and although the impulses 50 supplied during the closed periods of the coding device are not shown in Fig. 12 it is to be understood that they are present.

During the open periods of contact 88 of the coding device CT pulses 50 are supplied to the receiver 20 as a result of energy reflected from the aircraft. The pulses 50 which result from energy reflected from the actual target are supplied to the receiver 20 at varying intervals depending on the location of the aircraft in the searched zone, and the intervals between successive pulses in Fig. 12 indicate the periods during which the beam from the antenna 14 does not cover the aircraft. However, as explained above, the periods during which impulses of energy reflected from the aircraft are supplied to receiver 20 are of such frequency and duration as to keep the contacts of relay DR steadily picked up.

Accordingly, as long as an actual target is present in the searched zone the envelope 52 of the energy pulses supplied to relay DR is substantially continuous and the contacts of relay DR are continuously picked up and energy is not supplied through the transformer DT to the relay CR and its contacts release to cause the occupied indication to be displayed.

Figure 13:
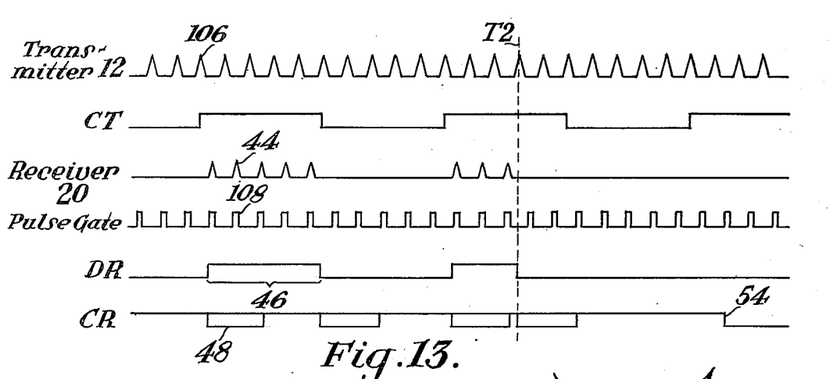

Referring to Fig. 13, it will be noted that the left-hand portion of the chart shows the operation of the equipment in the normal manner as shown in Fig. 11. However, it is assumed that at the time T2, a failure of the radar equipment occurs in such manner as to disable the receiver. The failure of the receiver 20 interrupts the supply of impulses of energy from the receiver 20 to the pulse gate 62 and as a result the relay DR no longer receive energy impulses 46 from the pulse gate 62. Accordingly, the relay DR is deenergized as the contacts cease to operate, thus depriving relay CR of energy supplied through decoding transformer DT, and after a short time interval the contacts of relay CR release at the point shown.

While we have shown an arrangement of our equipment in Fig. 8 designed to cover one particular altitude zone, it is to be understood that by various well-known means it is readily possible to employ this equipment to cyclically check the occupancy of an aircraft lane at any of various altitude zones, checking several altitude zones one at a time in a sequence through a cycle and repeating these cycles.

It is also to be understood in the arrangements previously described that rather than cover the particular area to be searched by continuously scanning beams, it is possible to have a beam scan the area only during the time that a target is not detected. When a target enters the area and is detected, the equipment may be so arranged that the scanning operation is stopped and automatic tracking equipment is used to follow the course of the aircraft through the area. Equipment for effecting the automatic tracking of the radar equipment is well known in the art and has not been shown in order to simplify this disclosure. After the aircraft has departed from the area, the equipment would then resume its original scanning operation.

It will be seen from the foregoing that when the antenna is oscillated to scan a certain area, it is necessary to provide a substantially continuous check that the antenna is scanning. As shown in Fig. 8, this may be accomplished by a relay controlled over contacts on the scanning mechanism and governing detecting means responsive to the operation of the contacts of the relay. The equipment may be arranged so that the antenna operation checking relay is utilized to control the artificial target in lieu of the coding device previously described.

Figures 14, 15:
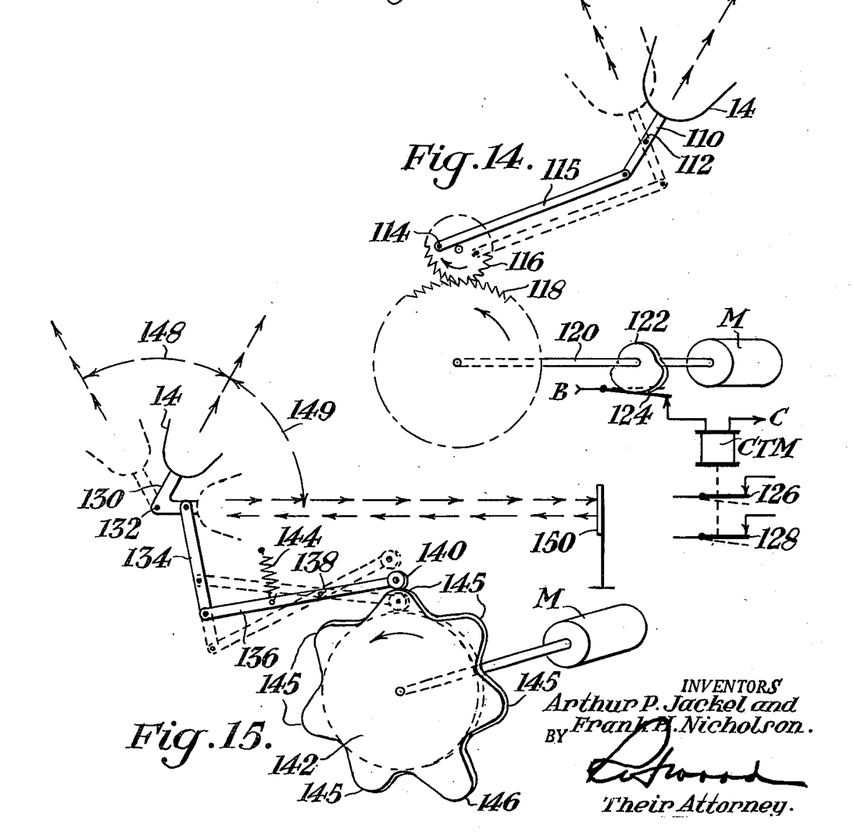
Fig. 14 is an illustration of an arrangement whereby the operation of the scanning antenna serves to operate a relay to provide recurrent coding of the artificial target.
Fig. 15 is an illustration of an arrangement wherein an artificial ground target is used in lieu of the "echo box" and coding device shown in Fig. 1.

In Fig. 14 of the drawings we have shown one such arrangement. The antenna 14 is operated in an arc by a lever 110 pivoted at the point 112. A connecting rod 115 connects the lever 110 to a crank pin 114 on the gear wheel 116, which meshes with another gear 118. The gears 116 and 118 are selected so that the gear 116 will revolve several times during one revolution of gear 118. The gear wheel 118 is driven by any suitable means, such as a motor M connected to the shaft 120. Fixedly mounted on the shaft 120 is an eccentric 122 which has a contour such that it causes contact 124 to be closed during substantially one-half of each revolution of the shaft 120, while permitting contact 124 to be moved by biasing means, not shown, to its open position during the remainder of each revolution of the shaft 120. A relay CTM is energized by a circuit including contact 124.

In operation, as the shaft 120 is revolved by the motor M, the gear wheel 118 drives the gear wheel 116, the rotary motion of which oscillates the lever 110 about its pivot 112, thereby causing the antenna 14 to be oscillated in an arc. For each revolution of the large gear 118, the antenna 14 is oscillated a plurality of times, depending upon the ratio between the driving gear 118 and the driven gear 116. Once during each revolution of the shaft 120, the cam 122 causes contact 124 to close, and thereby energizes relay CTM. Contacts 126 and 128 of relay CTM may be used in the circuits shown in Figs. 1 and 8 in lieu of contacts of the coding device CT. It will be seen, therefore, that with the equipment operating normally the antenna 14 is oscillated to scan the searched area, while during some of the movements of the antenna 14 the contacts of relay CTM are picked up to cause the actuation of the artificial target.

If the antenna should stop oscillating, due to a failure of the motor M, the contact 124 would remain either continuously open or continuously closed, and as a result, the coding of the artificial target would cease, thereby releasing the control relay CR, and interrupting the circuits controlled over its contacts.

Where the modification shown in Fig. 14 is employed it is unnecessary to employ the relays ADR and APR shown in Fig. 8. This is true because in the modification shown in Fig. 14, failure of the antenna to oscillate results in cessation of the coding of the phantom target equipment. Accordingly, the phantom target will cease to supply energy pulses, in which case relay DR will be continuously released, or the phantom target will continuously supply energy impulses, in which case relay DR will be continuously picked up. In either case energy will not be supplied to relay CR and it will release.

In Fig. 15 we have shown a diagrammatic view of an arrangement of equipment embodying our invention, in which the radar equipment is checked by means of an artificial target on the ground. This arrangement may be used in place of the arrangement shown in Fig. 1, obviating the use of the "echo box" and coding device CT to provide an artificial target for the radar equipment, while it makes unnecessary the use of means of the type shown in Fig. 8 for checking the scanning operation of the antenna 14. As shown in Fig. 15, the antenna 14 is attached to one arm of a bell crank 130, which is pivoted at the point 132. A connecting rod 134 connects the other arm of the bell crank 130 to a lever 136, which is pivoted at the point 138. A roller 140 is provided on the end of the lever 136 and is maintained in contact with the surface of the cam 142 by a tension spring 144. The cam 142 has a plurality of projections which are separated by recesses or portions of reduced diameter. As shown, the cam 142 has six projections, designated 145, which are of substantially identical size and contour and one projection, designated 146, which is considerably higher than the projections 145. The projections are substantially uniformly spaced around the circumference of the cam and are of such contour as to cause the antenna 14 to move at a substantially uniform speed throughout its entire range of movement.

In operation, as the cam 142 is revolved by the motor M, the roller 140 follows the undulations of the cam surface, and this motion is magnified and transmitted to the connecting rod 134 by the lever 136. The connecting rod 134 and bell crank 130 thereby impart an oscillatory motion to the antenna 14. As the roller 140 is alternately raised and lowered by the projections 145, the antenna 14 oscillates through an arc which is designated as 148, and is of such magnitude as to cover the zone being searched by the equipment with which the antenna 14 is associated.

However, when projection 146 engages the roller 140, the antenna 14 is deflected through an additional arc 149, so that it is then in a substantially horizontal position.

An artificial ground target 150, which may comprise a metal sheet fastened to a pole or other convenient support, is located at a distance from the radar equipment which is at least as great as the minimum range of the radar equipment. The target 150 is arranged so that when the antenna 14 is deflected to its substantially horizontal position, reflections will be received from the artificial target which will cause the relay DR to pick up.

Accordingly, the antenna 14 will scan the area to be searched for six complete cycles, and then will be deflected to detect the artificial target 150. As a result, as long as no actual target is present in the searched zone the relay DR is recurrently picked up and released, and thus the control relay CR will be energized. If an actual target enters the searched area, energy will also be supplied to relay DR each time the antenna 14 scans the area, with the result that the relay DR is substantially continuously energized and causes relay CR to release. Should the antenna stop scanning, the intermittent reflections from the artificial target 150 will also cease, causing the release of relay CR.

Should the antenna stop while pointing at the ground target, the pulses of energy will be continuously reflected to the radar set, and as a result, the relay DR will be continuously picked up, causing relay CR to release.

It is to be understood that the arrangement for operating the antenna 14 as shown in Figs. 14 and 15 is not limited to the mechanical arrangements shown, these arrangements only being one possible manner of achieving the desired operation.

Our invention is equally applicable to systems using radiant energy other than radio for purposes of object detection.

Although we have herein shown and described only two forms of apparatus embodying our invention, it is understood that various changes and modifications may be made therein within the scope of the appended claims without departing from the spirit and scope of our invention.

Having thus described our invention, what we claim is:

1. An airway lane occupancy detection system comprising a directive antenna arranged to cover a section of an airway lane, means including said antenna for transmitting radio energy pulses, receiving means for detecting said radio pulses after reflection, a detector relay controlled by said receiving means and arranged so that its contacts are operated to one position when said receiving means detects reflected pulses and are operated to their other position when said receiving means does not detect reflected pulses, means including a control relay for detecting continuous operation of said relay contacts between their two positions, means for recurrently reflecting said radio pulses, and a circuit governed by contacts of said control relay.

2. In a system for locating objects by radio pulse reflections, in combination, a transmitter which generates pulses of radio energy of a certain carrier frequency at a selected rate, a directional antenna for radiating said pulses in a given radiation pattern, a receiver for detecting and amplifying signals comprising pulses of said energy received by said antenna, means for rendering said receiver inoperative during the time that a pulse is delivered to said antenna from said transmitter, a detector relay governed by said receiver, said relay having contacts operated to one position when no signal is detected by said receiver, and operated to their other position when a signal is detected by said receiver, a radio energy pick-up device disposed in the radiation pattern of said antenna, a tunable resonant type of radio energy storage device connected to said energy pick-up device by suitable means, tuning means for causing said radio energy storage device to at times be responsive to radio energy of the same frequency as that of said transmitter, and at other times to be non-responsive to energy of the frequency as that of said transmitter, means for recurrently operating said tuning means at a rate substantially lower than the rate of generation of radio pulses by said transmitter, means including a control relay for detecting the continuous operation of the contacts of said detector relay between their two positions, and a circuit governed by contacts of said control relay.

3. In a system for locating objects by radio pulse reflections, in combination, a transmitter which generates pulses of radio energy of microwave carrier frequency at a selected rate, a directional antenna for radiating said pulses in a given radiation pattern, a receiver for detecting and amplifying signals comprising pulses of said energy received by said antenna, means for rendering said receiver inoperative during the time that a pulse is delivered to said antenna by said transmitter, a detector relay governed by said receiver, said detector relay having contacts which are operated to one position when no signal is detected by said receiver and are operated to their other position when a signal is detected by said receiver, an artificial target comprising an auxiliary antenna disposed in the radiation pattern of said directional antenna, a resonant cavity, means for coupling said resonant cavity to said auxiliary antenna, a tuning slug normally biased so that it extends into said cavity and causes said cavity to be non-resonant at the carrier frequency of said transmitter, a solenoid for attracting said slug, said cavity being resonant at the carrier frequency of said transmitter when the tuning slug is withdrawn therefrom, a coding device having recurrently operated contacts, a circuit including contacts of said coding device for supplying energy to said solenoid, and means including a control relay for detecting the continuous operation of the contacts of said detector relay between their two positions.

4. In a system for locating objects by radio pulse reflections, in combination, a transmitter which generates pulses of radio energy of microwave carrier frequency at a selected rate, a directional antenna for radiating said pulses in a given radiation pattern, a receiver for detecting and amplifying signals comprising pulses of said energy received by said antenna, means for rendering said receiver inoperative during the time that a pulse is delivered to said antenna by said transmitter, a detector relay governed by said receiver, said detector relay having contacts which are operated to one position when no signal is detected by said receiver and are operated to their other position when a signal is detected by said receiver, an artificial target comprising an auxiliary antenna disposed in the radiation pattern of said directional antenna, a resonant cavity, means for coupling said resonant cavity to said auxiliary antenna, a tuning slug normally biased so that it extends into said cavity and causes said cavity to be non-resonant at the carrier frequency of said transmitter, a solenoid for attracting said slug, said cavity being resonant at the carrier frequency of said transmitter when the tuning slug is withdrawn therefrom, a coding device having recurrently operated contacts, a circuit including contacts of said coding device for supplying energy to said solenoid, means including a control relay for detecting the continuous operation of the contacts of said detector relay between their two positions, and a circuit governed by contacts of said control relay.

5. In an airway lane occupancy detection system, in combination, a directive main antenna for radiating a fan-shaped beam, antenna oscillating means for causing said antenna to operate in such manner that its beam recurrently traverses a substantially definite section of an airway lane at a selected rate, means including an auxiliary relay for detecting the continuous operation of said main antenna, pulse generating means, transmitting means including said main antenna for transmitting radio energy and governed by said pulse generating means, receiving means including said main antenna for receiving radio energy, a detector relay, a pulse gate circuit for at times permitting energy to be supplied to said detector relay from said receiving means and at other times preventing energy from being supplied to said detector relay from said receiving means, said pulse gate circuit being governed by control pulses delivered from said pulse generator, means for varying the duration of said control pulses and for delaying the application of said control pulses to said pulse gate as the angle of elevation of said main antenna is varied, said detector relay having contacts which are operated to a first position when no signal is detected by said receiver and are operated to a second position when a signal is detected by said receiving means, an artificial target comprising, receiving means for detecting pulses of radio energy transmitted from said main antenna, means for delaying pulses of radio energy detected by said receiving means by an interval which varies as the angle of elevation of said main antenna is varied, and means for recurrently causing said delayed pulses to be re-radiated to said main antenna, means including a control relay for detecting the operation of the contacts of said detector relay between their first and their second positions, and a circuit controlled by contacts of said auxiliary relay and said control relay.

6. An airway lane occupancy detection system comprising a directive antenna for radiating a fan-shaped beam, antenna oscillating means for causing said antenna to operate in such manner that its beam recurrently traverses a substantially definite section of an airway lane at a selected rate, transmitting means including said antenna for transmitting pulses of radio energy, receiving means including said antenna for receiving said pulses after reflection, means including a detector relay for detecting the reception of said reflected pulses, reflecting means for causing recurrent reflections of said transmitted pulses at a rate substantially lower than that of said antenna oscillating means, said reflecting means being governed by a circuit including a contact operated by said antenna oscillating means, means including a control relay for checking the recurrent response of said detector relay to said reflected pulses, and a circuit governed by contacts of said control relay and contacts of said auxiliary relay.

7. An airway lane occupancy detection system comprising a directive antenna for radiating a fan-shaped beam, antenna oscillating means for causing said antenna to operate in such a manner that its beam recurrently traverses a substantially definite section of an airway lane at a selected rate, said means comprising a drive shaft driven by a motor, gearing for coupling said drive shaft to a driven shaft so that the driven shaft rotates substantially faster than said drive shaft, means actuated by said driven shaft for oscillating said antenna, transmitting means including said antenna for transmitting pulses of radio energy, receiving means including said antenna for receiving said pulses after reflection, means including a detector relay for detecting the reception of said reflected pulses, reflecting means for causing recurrent reflections of said transmitted pulses, said reflecting means being governed by a circuit including a cam-operated contact, said cam-operated contact being operated by a cam on said drive shaft so that the contact is closed once during each revolution of said drive shaft, means including a control relay for checking the response of said detector relay to said reflected pulses, and a circuit governed by contacts of said control relay.

8. An airway lane occupancy detection system comprising a directive antenna for radiating a fan-shaped beam, oscillating means for causing said antenna to operate in such manner that its beam recurrently traverses a substantially definite section of an airway lane at a selected rate, said means comprising a drive shaft, a cam wheel rotated by said drive shaft, said cam wheel having a plurality of projections and recesses on the periphery thereof, one of said projections being substantially higher than the remainder of said projections, a cam follower which is engaged by said cam wheel, said cam follower being connected to said antenna so that as said cam wheel revolves said antenna is oscillated in a predetermined arc and when said cam follower engages said one projection said antenna is deflected through an additional arc, a reflecting surface disposed so that said antenna faces said reflecting surface only when said cam follower engages said one projection, means including said antenna for transmitting radio energy pulses, receiving means for detecting said pulses after reflection, and means for detecting the alternate presence and absence of said reflected pulses.

9. In a radiant energy detection system, in combination, means for substantially continuously generating pulses of radio energy, means for directionally radiating said pulses in a beam having a pattern such that it covers a particular area only, receiving means for detecting said radiated pulses after reflection from a target, a phantom target disposed in the path of said radiated pulses, means responsive to the pulses impinging upon said phantom target for supplying to said receiving means recurrent groups of said pulses, detecting means controlled by said receiving means and including a detector relay having contacts which are operable only when said recurrent groups of pulses are supplied to said receiving means, and a control relay governed by the recurrent operation of the contacts of said detector relay.

10. In an airway lane ocupancy detection system having means for transmitting radio pulses and after reflection from a target receiving them only during a period occurring a predetermined time interval subsequent to their transmission, the combination with the foregoing apparatus of checking means for continuously checking the operation of said transmitting and receiving means, said checking means comprising a phantom target responsive to energy transmitted by said transmitting means and operative when rendered effective to supply to said receiving means after each pulse is transmitted by said transmitting means an impulse of energy which is received by said receiver during said period following said predetermined time interval, means for recurrently rendering said phantom target effective, a code following relay governed by said receiver and having contacts which are moved to a first position when said receiver responds to energy reflected from an actual target or supplied from said phantom target and are moved to a second position when said receiver is not receiving energy from an actual or said phantom target, and means responsive to movement of the contacts of said code following relay between its two positions.

11. In an airway lane occupancy detection system having means for transmitting radio pulses and after reflection from a target receiving them only during a period occurring a predetermined time interval subsequent to their transmission, said receiving means having associated therewith timing means for gradually cyclically varying the duration of the time interval which must elapse after transmission of the radio pulse before said receiving means may respond, the combination with the foregoing apparatus of checking means for continuously checking the operation of said transmitting and receiving means, said checking means comprising a phantom target responsive to energy transmitted by said transmitting means and operative when rendered effective to supply to said receiving means after each pulse is transmitted by said transmitter an impulse of energy, means associated with said phantom target for gradually cyclically varying in accordance with variations in said timing means the time at which the energy impulses are supplied thereby so that said energy impulses are supplied to said receiving means during the time intervals during which said receiving means is conditioned to respond, means for recurrently rendering said phantom target effective, and means governed by response of said receiver to alternate periods in which energy is supplied thereto from said phantom target and in which energy is not reflected from an actual target.

12. In a radiant energy detection system having means for transmitting radio pulses and for receiving them after reflection from a target, the combination with the foregoing apparatus of checking means for continuously checking the operation of said transmitting and receiving means, said checking means comprising means responsive to radio pulses transmitted by said transmitting means and including a phantom target and operating to recurrently supply to said receiving means groups of pulses of energy, a code following relay having contacts biased to a first position, means for moving the relay contacts to a second position when said receiving means responds to energy reflected from an actual target or to energy supplied by said checking means, and means responsive to recurrent movement of the contacts of said code following relay between their two positions.

ARTHUR P. JACKEL.
FRANK H. NICHOLSON.

REFERENCES CITED

The following references are of record in the file of this patent:

UNITED STATES PATENTS

| Number | Name | Date |
|---|---|---|
| 2,408,848 | Hammond | Oct. 8, 1946 |
| 2,412,631 | Rice | Dec. 17, 1946 |
| 2,418,143 | Stodola | Apr. 1, 1947 |
| 2,420,211 | Tourshow | May 6, 1947 |
| 2,421,016 | Deloraine | May 27, 1947 |
| 2,425,330 | Kenyon | Aug. 12, 1947 |
| 2,425,600 | Coykendall | Aug. 12, 1947 |
| 2,432,984 | Budenbom | Dec. 23, 1947 |
| 2,433,002 | Norton | Dec. 23, 1947 |
| 2,433,868 | Sensiper | Jan. 6, 1948 |
| 2,459,811 | Grieg | Jan. 25, 1949 |
| 2,461,005 | Southworth | Feb. 8, 1949 |